United States Patent [19]
Abe et al.

[11] Patent Number: 5,992,784
[45] Date of Patent: Nov. 30, 1999

[54] LID ASSEMBLY FOR TAPE CARTRIDGE

[75] Inventors: Masanori Abe, Miyagi; Joichi Daiba; Katsumi Maekawa, both of Tokyo, all of Japan

[73] Assignee: Sony Corporation, Tokyo, Japan

[21] Appl. No.: 09/026,096

[22] Filed: Feb. 19, 1998

[30]     Foreign Application Priority Data

Feb. 28, 1997  [JP]  Japan .................................. 9-045643
Feb. 28, 1997  [JP]  Japan .................................. 9-045644

[51] Int. Cl.$^6$ .................................................. G03B 23/02
[52] U.S. Cl. ......................................................... 242/347.1
[58] Field of Search ............................ 242/347.1, 347.2; 360/132

[56]               References Cited

U.S. PATENT DOCUMENTS 5,596,464  1/1997  Sawada ................................... 360/132
5,622,326  4/1997  Taguchi ............................ 242/347.1 X
5,630,560  5/1997  Fujii et al. ....................... 242/347.1 X

FOREIGN PATENT DOCUMENTS 2102386  2/1983  United Kingdom ................... 360/132
2229160  9/1990  United Kingdom ................... 360/132

*Primary Examiner*—Donald P. Walsh
*Assistant Examiner*—William A. Rivera
*Attorney, Agent, or Firm*—Frommer Lawrence & Haug, LLP.; William S. Frommer

[57]                ABSTRACT

A tape cartridge includes a front lid rotatably mounted to a casing for closing a tape loading space thereof, a back lid rotatably mounted to the front lid and including a hood for closing a back-lid opening of the casing and a leg for protecting the back of a magnetic tape positioned in the tape lading space of the casing, an inclined face arranged on the upper side of the hood of the back lid to be adjacent to the casing, and a device for controlling a posture of the back lid. In the state of closing the back-lid opening of the casing, the inclined face gradually increases in level difference with respect to the upper side of the casing toward the casing.

18 Claims, 17 Drawing Sheets

FIG.14 *(PRIOR ART)*
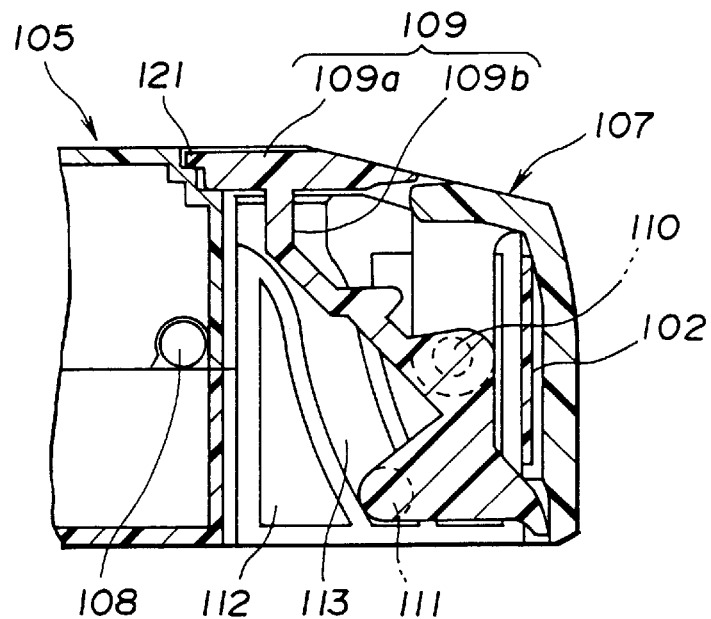
FIG.15 *(PRIOR ART)*
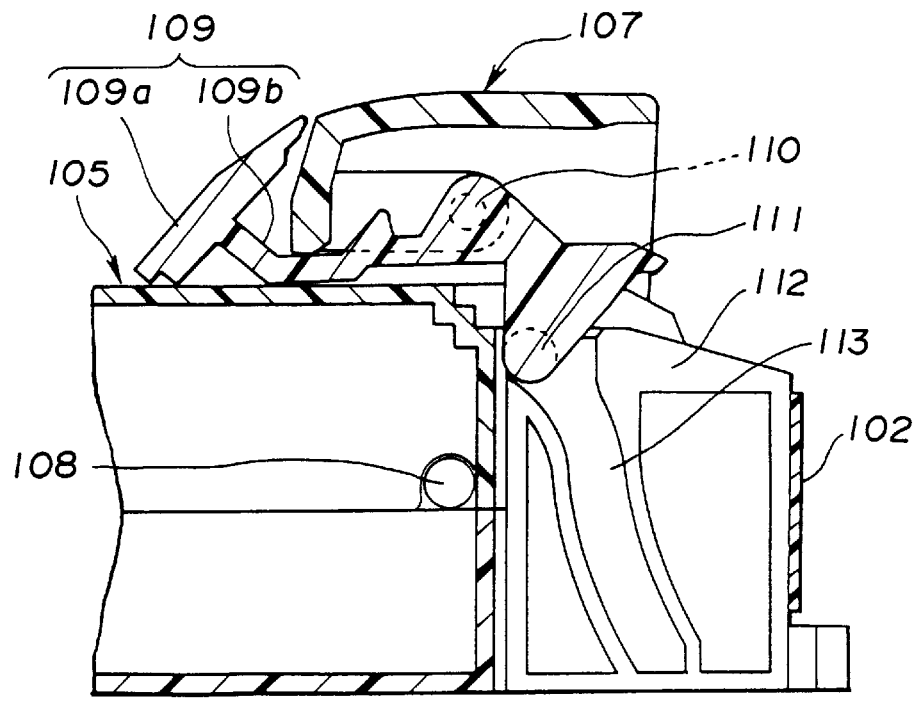

LID ASSEMBLY FOR TAPE CARTRIDGE

BACKGROUND OF THE INVENTION

The present invention relates to tape cartridges with lids such as a front lid and a back lid.

The tape cartridges with lids are used, e.g. in 8 mm video tape recorders (VTR). Referring to FIGS. 12–13, a known tape cartridge 101 includes a casing 105, a pair of tape reels 103, 104 rotatably accommodated therein and having a magnetic tape 102 wound, a front lid 107 rotatably mounted to the casing 105 through a shaft 108 for closing a tape loading space or pocket 106 thereof, and a back lid 109 rotatably mounted to the front lid 107 through a shaft 110. Referring to FIGS. 14–15, the back lid 109 has at an end a cam boss or back-lid posture control device 111 which is engaged with a cam groove 113 of a back-lid support 112 of the casing 105. When rotating the front lid 107 in the open or closed direction, the cam boss 111 of the back lid 109 is moved along the cam groove 113 of the casing 105 to open or close the back lid 109 together with the front lid 107.

The tape cartridge 101 is constructed such that as shown in FIG. 14, when closing the tape loading space 106 of the casing 105 by the front lid 107, a hood 109a of the back lid 109 shuts a back-lid opening 121 formed in the upper side of the casing 105, and a leg 109b of the back lid 109 which is positioned on the side of the back of the magnetic tape 102 in the tape loading space 106 cooperates with the inside of the front lid 107 to hold the magnetic tape 102 for protection thereof. On the other hand, as shown in FIG. 15, when opening the tape loading space 106 of the casing 105, the back lid 109 and the front lid 107 are placed on the upper side of the casing 105 to loadably expose the magnetic tape 102.

With the known tape cartridge 101, in order to obtain smooth sliding of the cam boss 111 in the cam groove 113 upon lid opening/closing operation, a predetermined clearance or play is needed between the outer side face of the cam boss 111 and the inner side face of the cam groove 113.

The clearance, which is indispensable for smooth sliding of the cam boss 111 in the cam groove 113, may cause rattling of the back lid 109, however. Referring to FIG. 16, with much rattling of the back lid 109, a casing-side end of the hood 109a of the back lid 109 projects from the back-lid opening 121 arranged on the upper side of the casing 105 (this phenomena is referred hereafter to as "projecting phenomena"), and engages with one end 201a of a cartridge compartment 201 of a VTR, resulting in impossible eject of the tape cartridge 101, etc. The projection of the back lid 109 occurs rarely when the tape cartridge 101 is supported with the hood 109a of the back lid 109 up, and often when the tape cartridge 101 is supported in the inclined way or with the hood 109a of the back lid 109a down.

It is, therefore, an object of the present invention to provide tape cartridges which allows restrained projection of the back lid.

SUMMARY OF THE INVENTION

One aspect of the present invention lies in providing a cartridge, comprising:
- a casing with a space arranged therein and an opening formed in an upper side, said space accommodating a tape-like recording means wound on reels;
- a front lid rotatably mounted to said casing, said front lid closing said space of said casing;
- a back lid rotatably mounted to said front lid, said back lid including a hood for closing said opening of said casing and a leg for protecting a back of said recording means positioned in said space of said casing;
- a first inclined face arranged on an upper side of said hood of said back lid to be adjacent to said casing, said first inclined face gradually increasing in a level difference with respect to said upper side of said casing toward said casing in the state of closing said opening of said casing; and
- a device arranged to control a posture of said back lid.

Another aspect of the present invention lies in providing a cartridge, comprising:
- a casing with a space arranged therein and an opening formed in an upper side, said space accommodating a tape-like recording means wound on reels;
- a front lid rotatably mounted to said casing, said front lid closing said space of said casing;
- a back lid rotatably mounted to said front lid, said back lid including a hood for closing said opening of said casing and a leg for protecting a back of said recording means positioned in said space of said casing;
- a reinforcement formed with said back lid, said reinforcement abutting on a contact part arranged in said space of said casing to prevent deep engagement of said hood of said back lid with said opening of said casing; and
- a device arranged to control a posture of said back lid.

BRIEF DESCRIPTION OF THE DRAWINGS

FIG. 14 is a view similar to FIG. 9, taken along the line XIV—XIV in FIG. 13;

FIG. 15 is a view similar to FIG. 14, showing the known tape cartridge with a lid open;

DETAILED DESCRIPTION OF THE INVENTION

Figure 1:
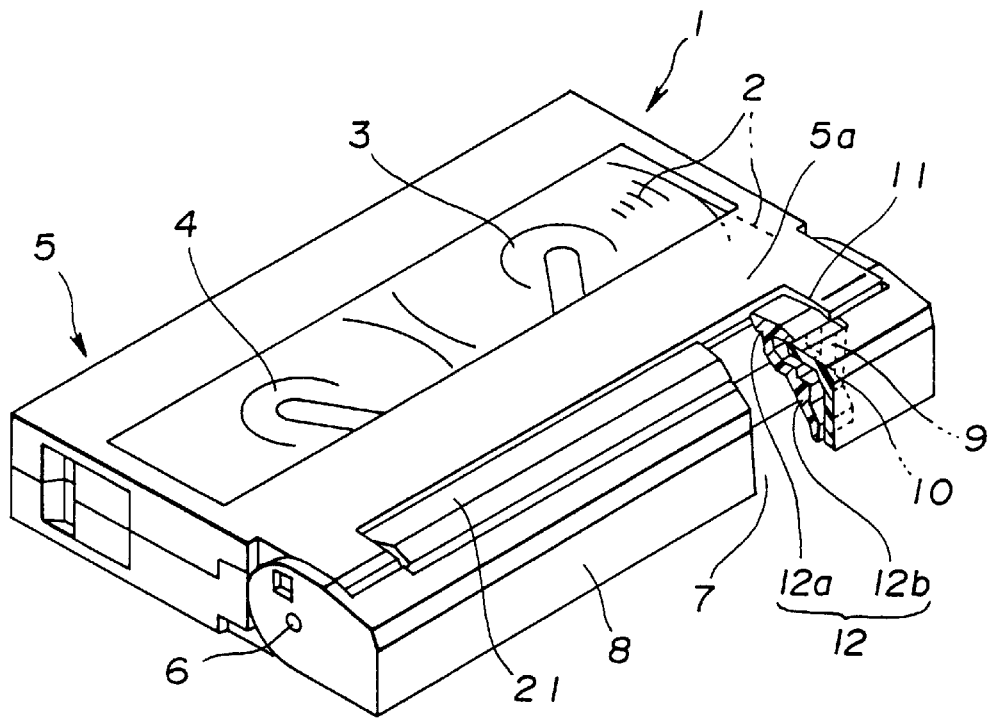
FIG. 1 is a perspective view, partly broken, showing a first embodiment of a tape cartridge according to the present invention.

Referring to the drawings, a tape cartridge embodying the present invention will be described.

Figure 2:
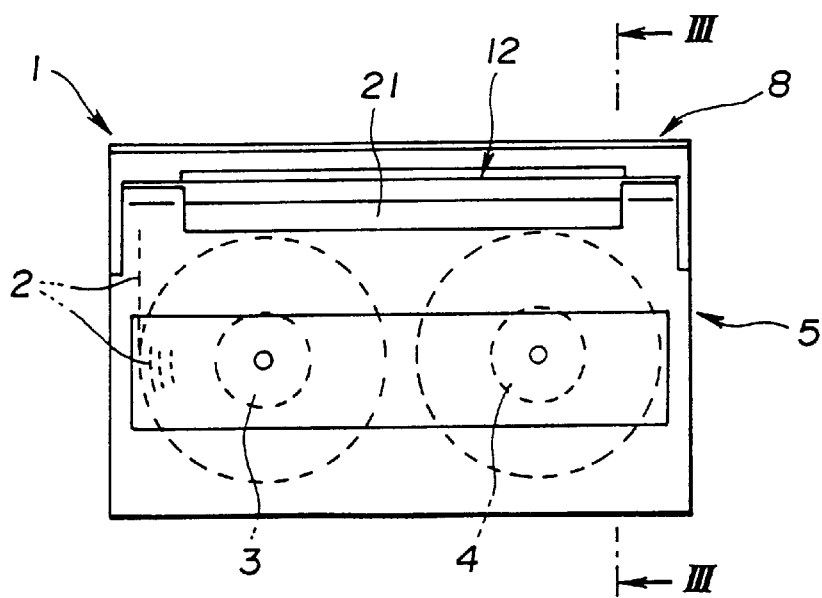
FIG. 2 is a plan view showing the tape cartridge.

FIGS. 1–6 show a first embodiment of the present invention. Referring to FIGS. 1–2, a tape cartridge 1 for use in an 8 mm video tape recorder (VTR) includes a casing or main body 5, a pair of tape reels 3, 4 rotatably accommodated therein and having a magnetic tape 2 wound, a front lid 8 rotatably mounted to the casing 5 through a shaft 6 for closing a tape loading space or pocket 7 thereof, a back lid 12 rotatably mounted to a bearing 9 of the front lid 8 through a shaft 10 and having a hood 12a for closing a back-lid opening 11 formed in an upper side 5a of the casing 5 and a leg 12b for protecting the back of the magnetic tape 2 positioned in the tape loading space 7, and a back-lid posture control device 13 (see FIG. 3) for controlling a posture of the back lid 12 which rotates with rotation of the front lid 8.

Figure 3:
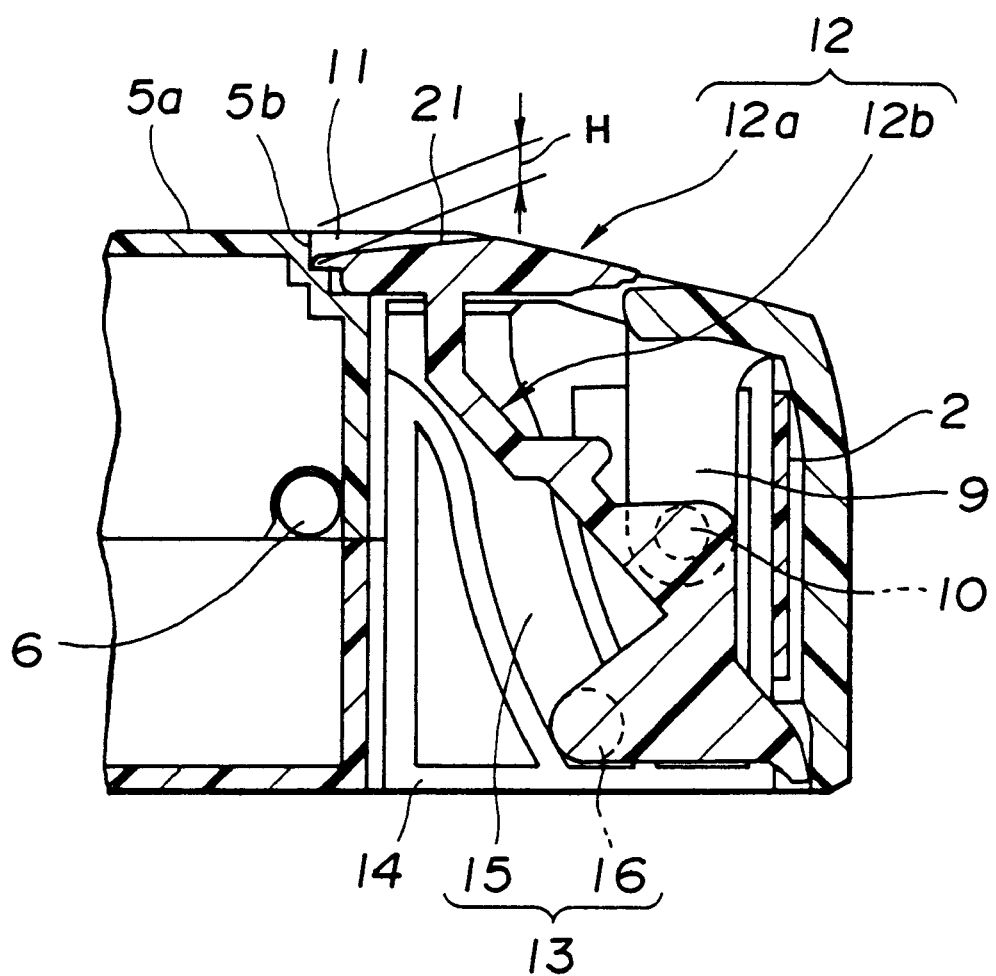
FIG. 3 is a sectional view, taken along the line III—III in FIG. 2.

Referring to FIG. 3, the back-lid posture control device 13 comprises a cam groove 15 formed in a back-lid support 14 and a cam boss 16 arranged with the leg 12b of the back lid 12 and slidably engaged with the cam groove 15. In order to obtain smooth sliding of the cam boss 16 in the cam groove 15, a predetermined clearance or play is arranged between the inner side face of the cam groove 15 and the outer side face of the cam boss 16.

When closing the tape loading space 7 of the casing 5, the hood 12a of the back lid 12 shuts the back-lid opening 11 of the upper side 5a of the casing 5, and the leg 12b of the back lid 12 protects the back of the magnetic tape 2 positioned in the tape loading space 7.

The hood 12a of the back lid 12 has on the side of the casing 5 an inclined face 21 which gradually increases in level difference with respect to the upper side 5a of the casing 5 toward one end 5b of the back-lid opening 11 as shown in FIG. 3 when closing the back-lid space 11 of the upper side 5a of the casing 5.

In the state of closing the back-lid opening 11 of the upper side 5a of the casing 5 by the hood 12a of the back lid 12, a maximum level difference H between a casing-side end of the inclined face 21 of the hood 12a of the back lid 12 and the upper side 5a of the casing 5 is greater than a projection amount of the hood 12a of the back lid 12 produced by the projecting phenomena thereof.

Figure 5:
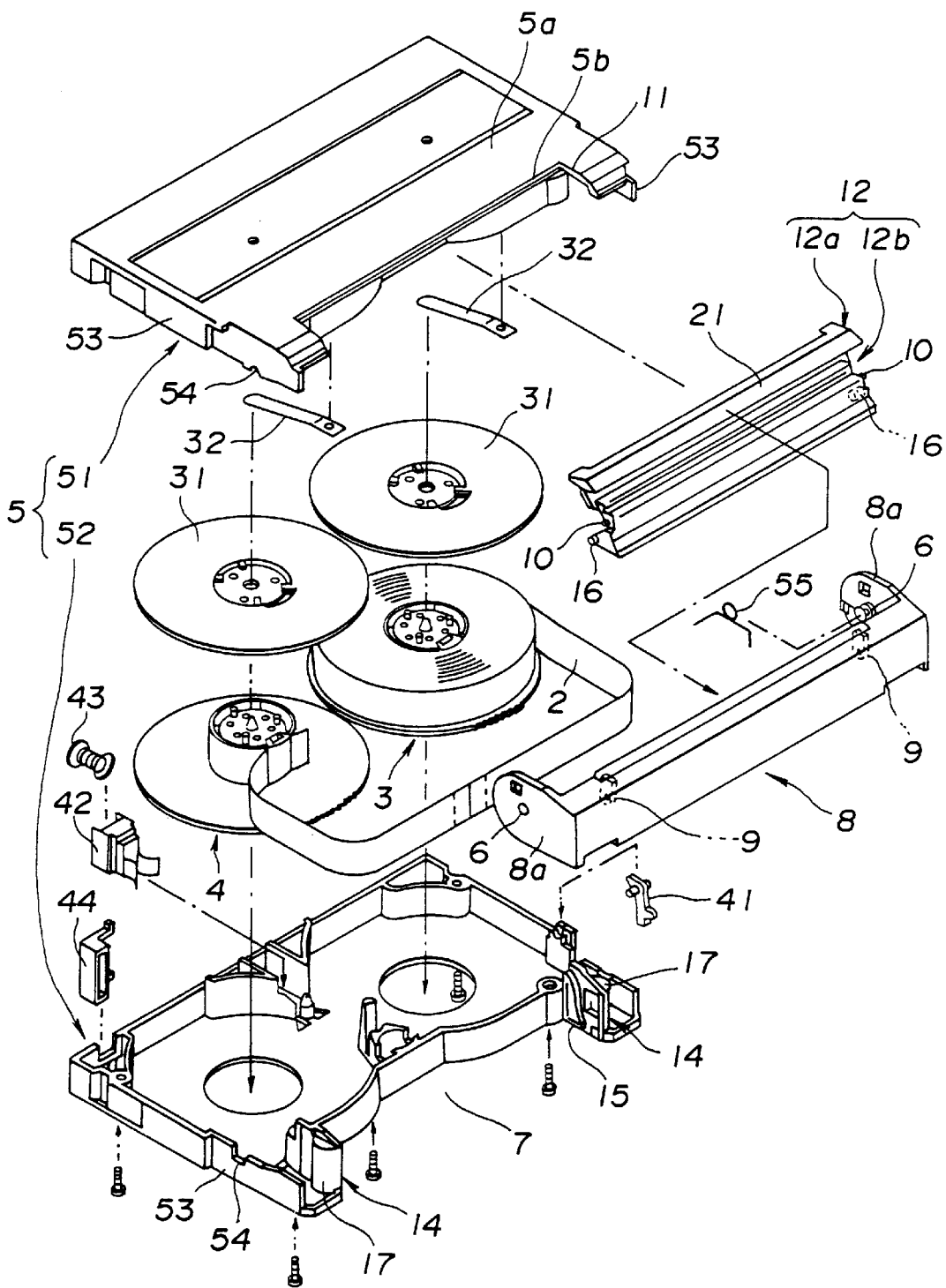
FIG. 5 is an exploded perspective view showing the tape cartridge.

Referring next to FIG. 5, the structure of the casing 5, the front lid 8, and the back lid 12 will be described in detail.

The casing 5 comprises an upper half 51 and a lower half 52. The upper half 51 has a back-lid opening 11 in the upper face 5a. On the other hand, the lower half 52 has a pair of back-lid supports 14 on both sides of the tape loading space 7.

The back-lid supports 14 have opposite or inside faces formed with a pair of cam grooves 15, and outside faces formed with a pair of semi-cylindrical tape guides 17. The tape guide 17 serves to guide the magnetic tape 2 wound on the tape reels 3, 4 to run in the tape loading space 7 arranged in the lower half 52.

The front lid 8 has at both ends as viewed in the longitudinal direction a pair of arms 8a having opposite or inside faces to which shafts 6 are arranged. The front lid 8 is rotatably mounted to the casing 5 in the state held by the side walls 53 of the upper and lower halves 51, 52 through the shafts 6 of the opposite faces of the arms 8a, which are engaged with bearing recesses 54 formed in side walls 53 of the upper and lower halves 51, 52. Moreover, the front lid 8 undergoes torque of a torsion coil spring 55 to close the tape loading space 7.

The front lid 8 has inside the arms 8a a pair of bearings 9 as will be described later and for rotatably supporting the back lid 12.

As described above, the back lid 12 comprises the hood 12a and the leg 12b. The inclined face 21 is formed at the casing-side end of the hood 12a, and a pair of shafts 10 and a pair of cam bosses 16 are formed at both sides of the leg 12b as viewed in the cross direction thereof.

The back lid 12 is mounted between the casing 5 and the front lid 8 through the shafts 10 rotatably mounted to the bearings 9 of the front lid 8, and the cam bosses 16 engaged with the cam grooves 15 of the opposite faces of the back-lid supports 14 of the lower half 52.

The tape reel 3, 4 includes an upper plate 31, and a plate spring 32 for lightly biasing the upper plate 31 and thus the tape reel 3, 4 to the lower half 52.

Rotatably mounted to the lower half 52 is a lid lock 41 for locking the front lid 8 in the closed way, whereas slidably mounted thereto is a reel lock 42 for unrotatably locking the tape reels 3, 4. The reel lock 42 is biased by a coil spring 43 in the direction of obtaining reel locking. Moreover, an anti-erase member 44 is slidably mounted to the lower half 52.

Next, the operation of the first embodiment will be described. When closing the tape loading space 7 of the casing 5 by the front lid 8, the back lid 12 is in a state as shown in FIG. 3 that the cam boss 16 of the leg 12b is positioned at the lower end of the cam groove 15, and the hood 12a closes the back-lid opening 11 of the upper side 5a of the upper half 51 of the casing 5.

Figure 6:
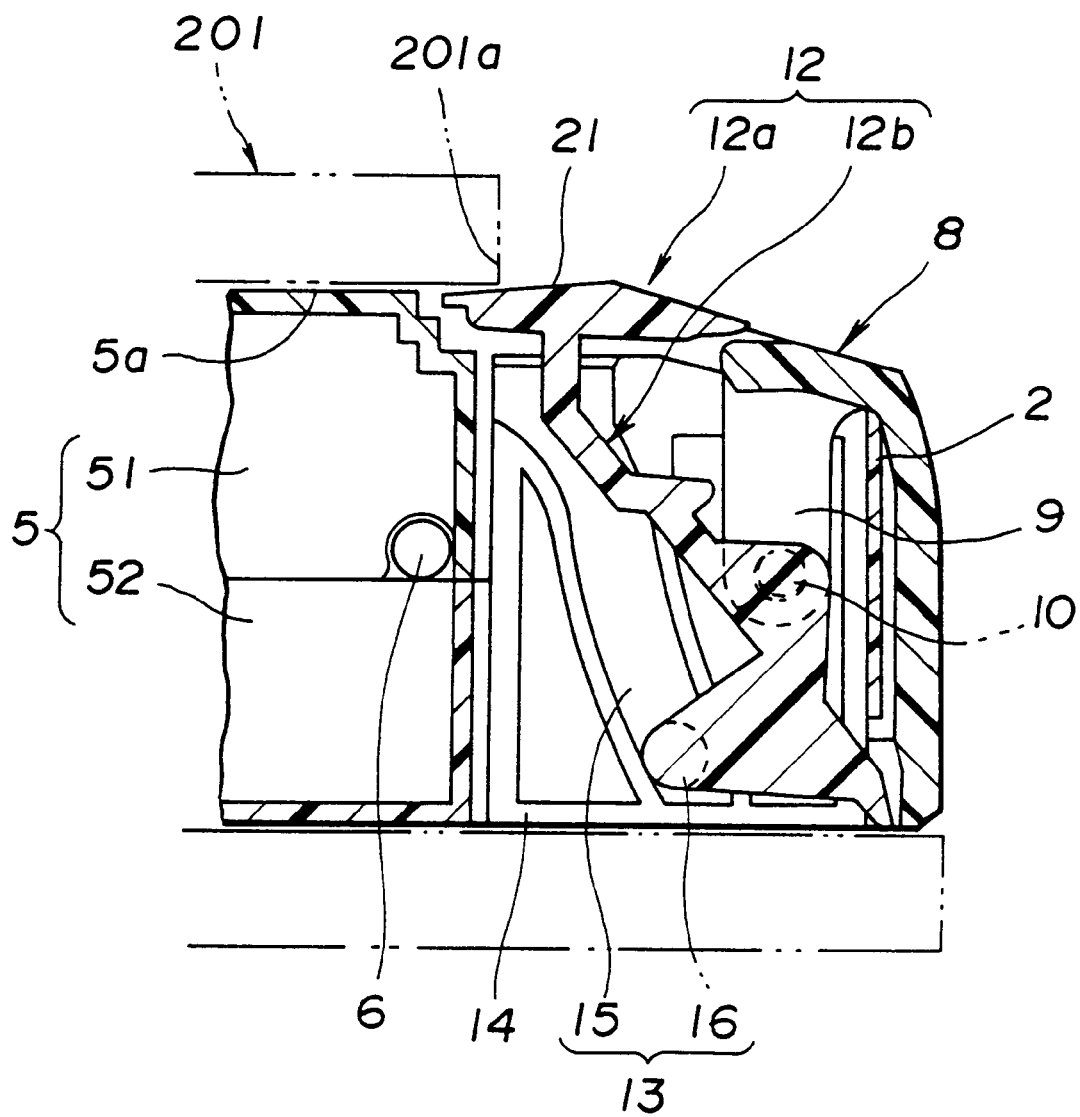
FIG. 6 is a view similar to FIG. 4, showing an effect of the first embodiment.
Figure 7:
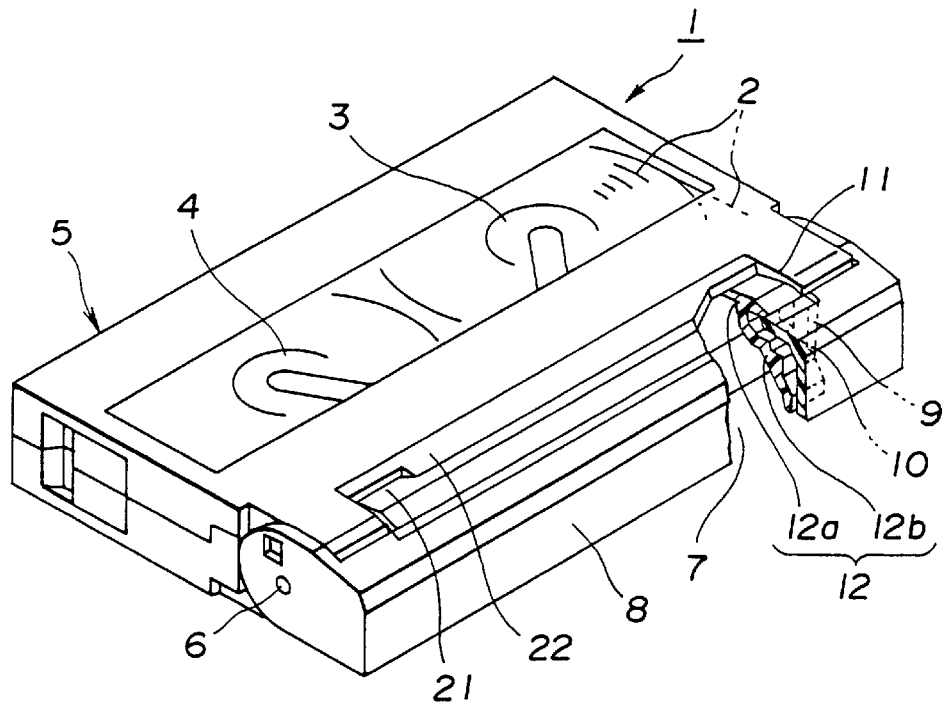
FIG. 7 is a view similar to FIG. 1, showing a second embodiment of a tape cartridge.
Figure 8:
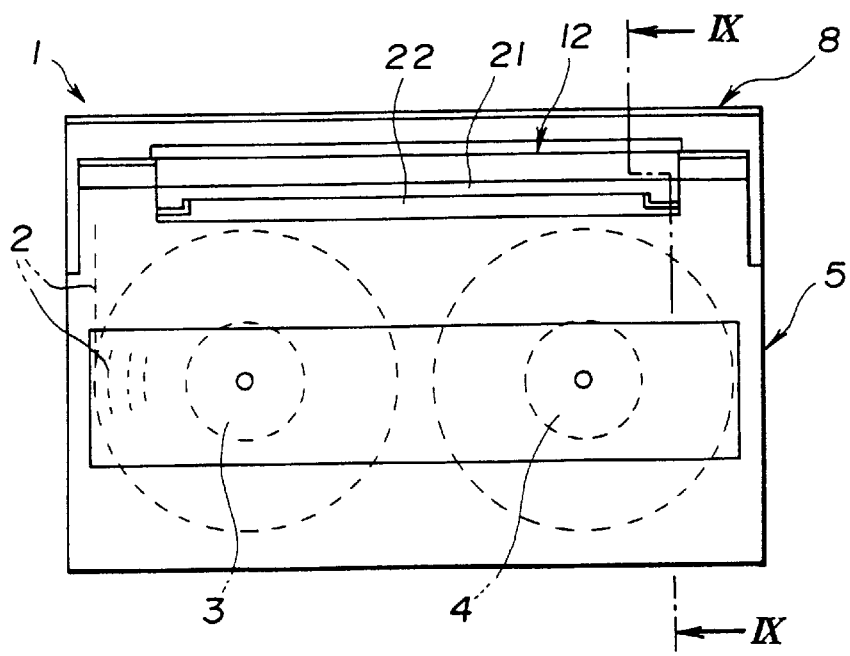
FIG. 8 is a view similar to FIG. 2, showing the tape cartridge.
Figure 9:
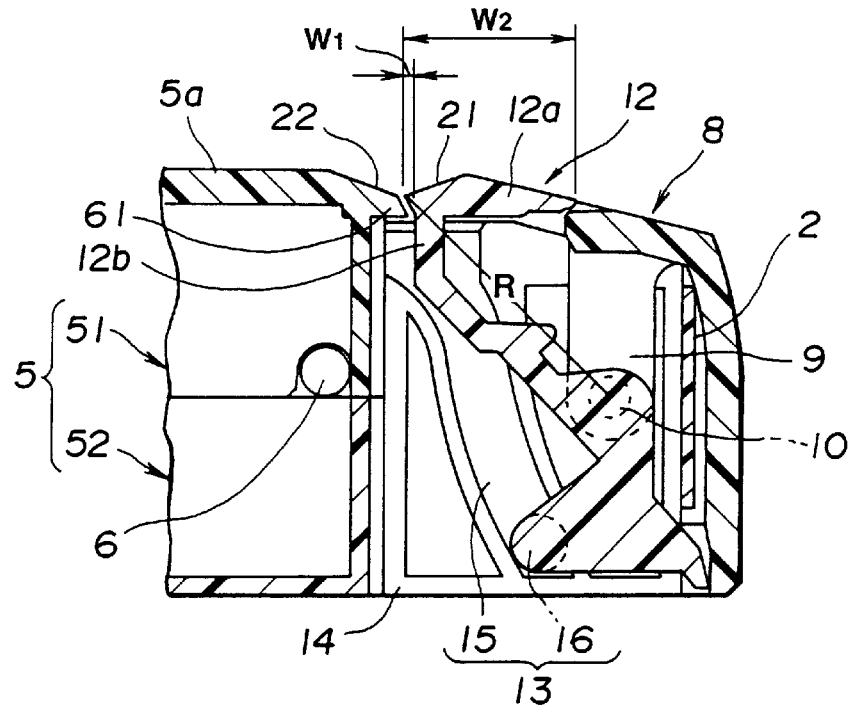
FIG. 9 is a view similar to FIG. 6, taken along the line IX—IX in FIG. 8.
Figure 10:
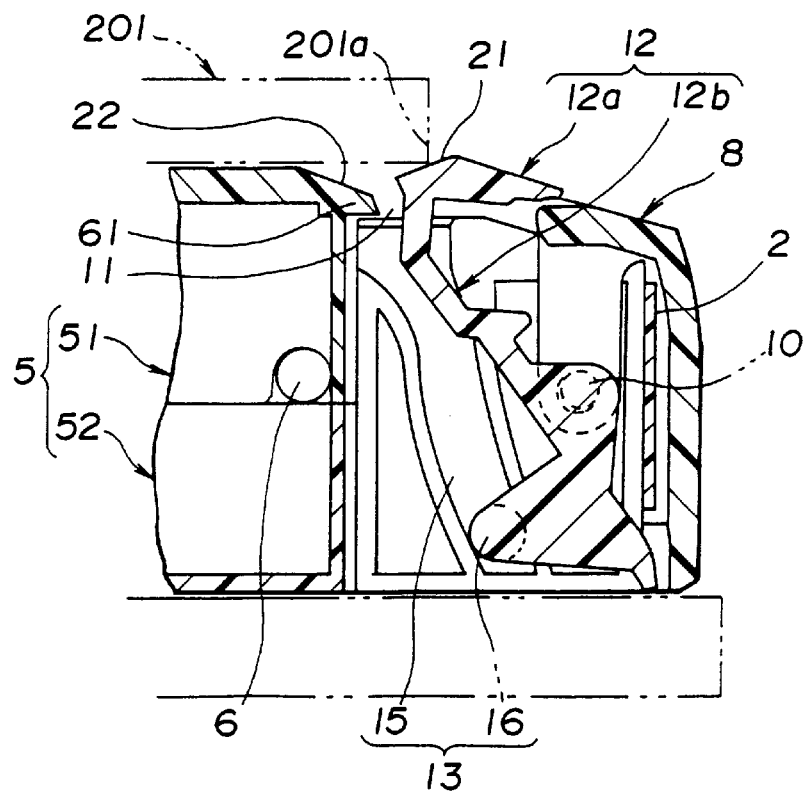
FIG. 10 is a view similar to FIG. 9, showing an effect of the second embodiment.
Figure 11:
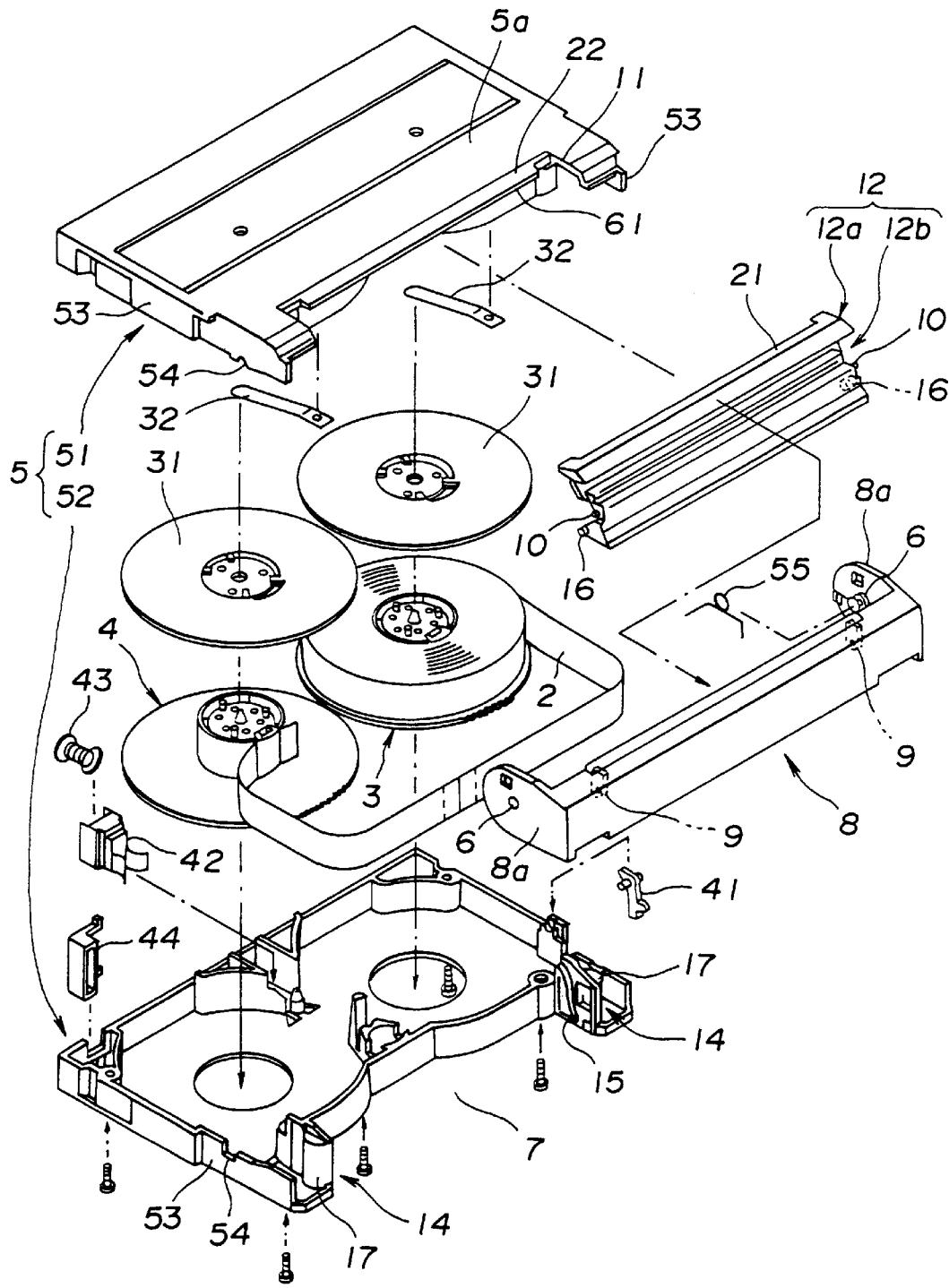
FIG. 11 is a view similar to FIG. 5, showing the tape cartridge.
Figure 12:
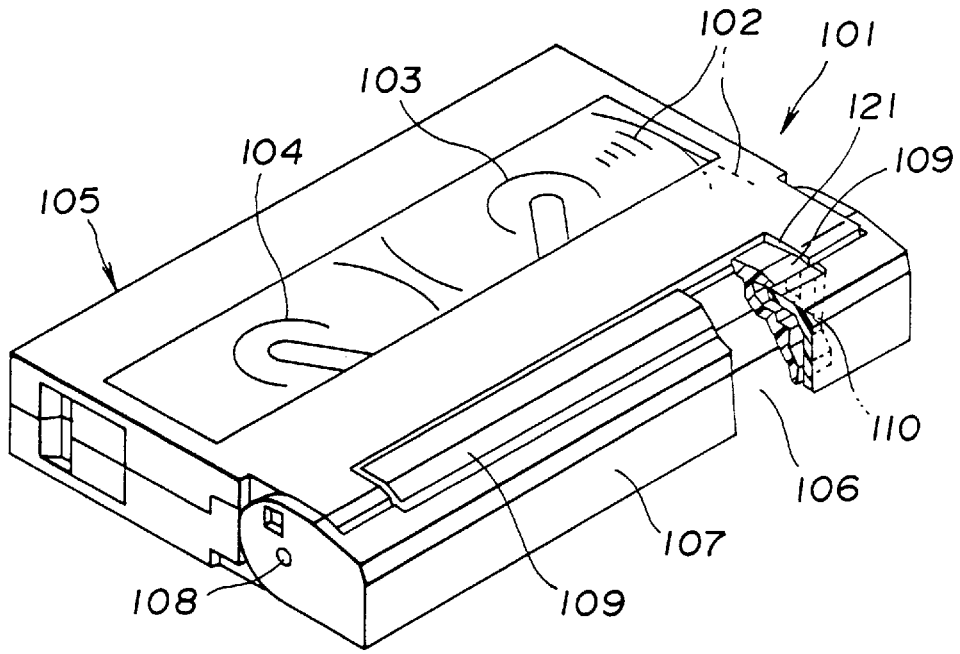
FIG. 12 is a view similar to FIG. 7, showing a known tape cartridge.
Figure 13:
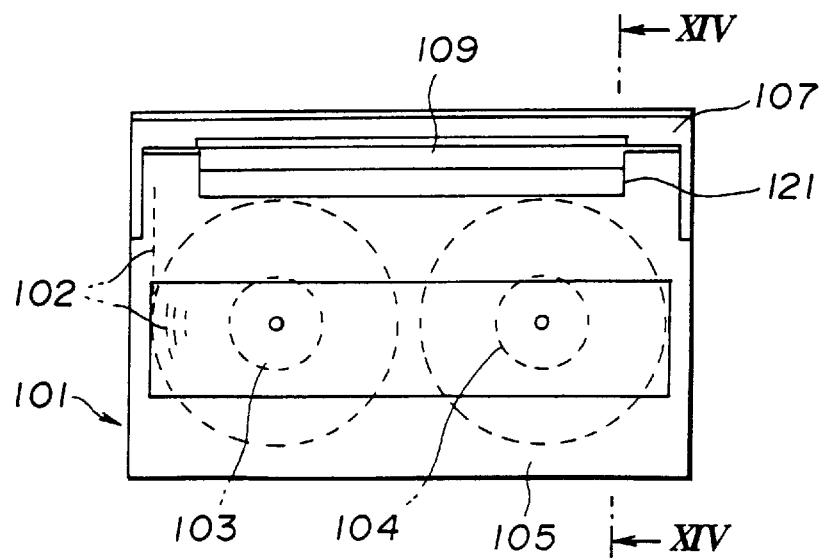
FIG. 13 is a view similar to FIG. 8, showing the known tape cartridge.
Figure 16:
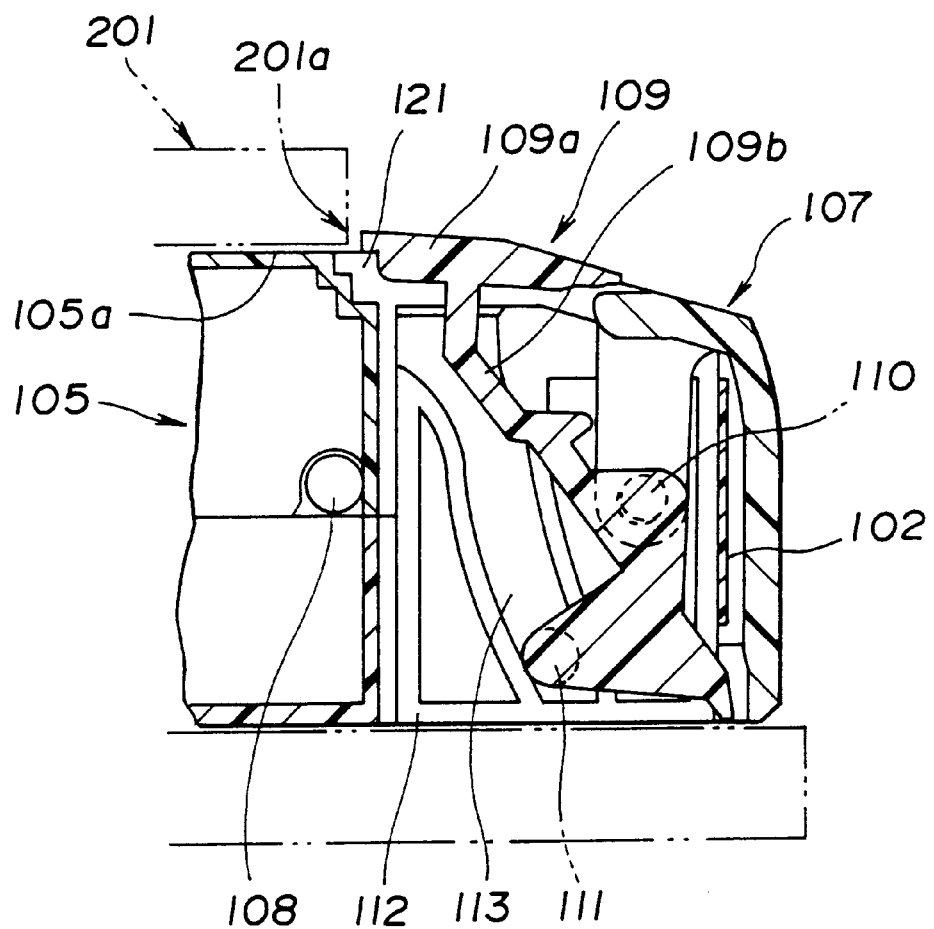
FIG. 16 is a view similar to FIG. 15, showing a problem of the known tape cartridge.

In the state of closing the back-lid opening 11 by the hood 12a, the maximum level difference H between the casing-side end of the inclined face 21 of the hood 12a and the upper side 5a of the upper half 51 is greater than the projection amount of the hood 12a of the back lid 12, so that even if the projecting phenomena of the back lid 12 is produced due to a clearance between the cam boss 16 and the cam groove 15, etc., the casing-side end of the hood 12a of the back lid 12 is positioned below the upper side 5a of the upper half 51 as shown in FIG. 6. This prevents impossible eject of the tape cartridge 1 due to the fact that the casing-side end of the hood 12a abuts on one end 201a of a cartridge compartment 201 of a VTR, and allows smooth eject of the tape cartridge 1 due to the fact that the inclined face 21 of the hood 12a abuts on the one end 201a of the cartridge compartment 201 to depress the hood 12b.

Figure 4:
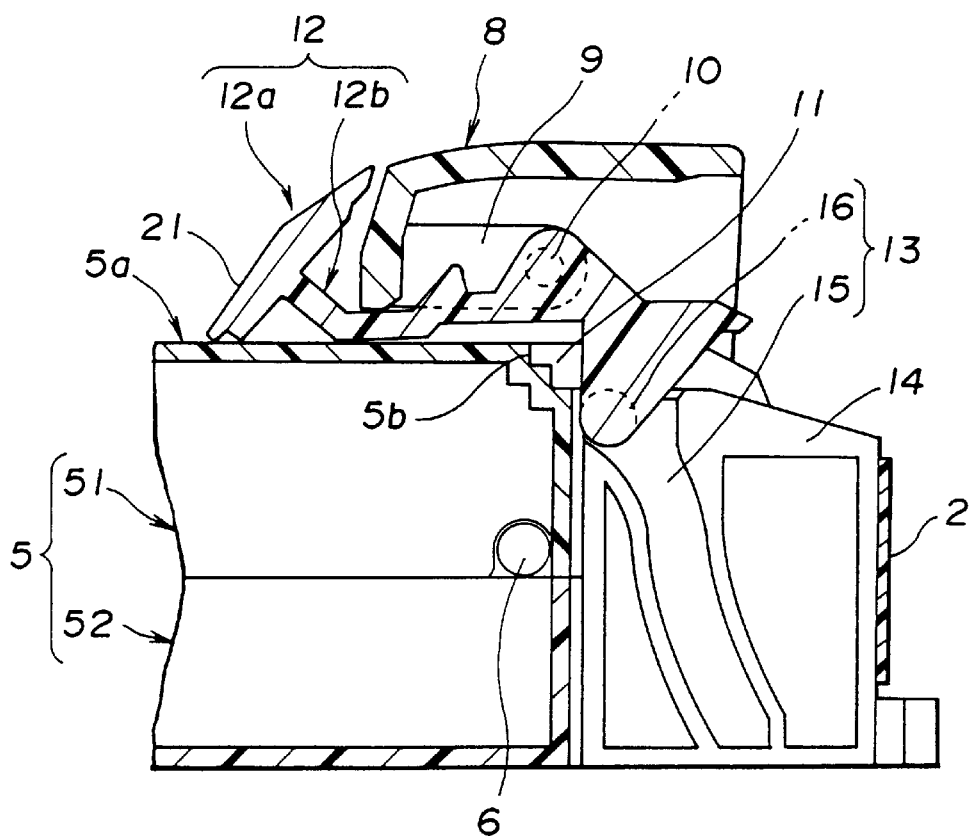
FIG. 4 is a view similar to FIG. 3, showing the tape cartridge with a lid open.

When rotating the front lid 8 to open the tape loading space 7, the cam boss 16 is slid upward in the cam groove 15 as shown in FIG. 4 so that the back lid 12 is placed on the upper side 5a of the upper half 51 of the casing 5, and the front lid 8 is placed on the back lid 12.

FIGS. 7–11 show a second embodiment of the present invention which is substantially the same as the first embodiment. In the second embodiment, referring to FIG. 9, the tape cartridge 1 is constructed such that a width $W_1$ from the casing-side end of the hood 12a of the back lid 12 to the leg 12b thereof is decreased as far as possible to reduce a distance or radius R from the casing-side end of the hood 12a to the shaft 10 as a center of rotation of the back lid 12, obtaining less projection amount of the hood 12a of the back lid 12. Moreover, an inclined face 22 is formed at a back-lid-opening-side end of the upper side 5a of the upper half 51 of the casing 5. The inclined face 22 is formed with substantially the same angle of inclination as that of the inclined face 21 of the hood 12a of the back lid 12. The lowermost ends of the two inclined faces 21, 22 correspond substantially to each other.

In view of the fact that a reduction in the width $W_1$ from the casing-side end of the hood 12a of the back lid 12 to the leg 12b thereof results in a reduction in an entire width $W_2$ of the hood 12a of the back lid 12, a protrusion 61 sticking out to the hood 12a is arranged with the casing 5 to decrease the width of the back-lid opening 11 of the upper side 5a of the casing 5, preventing an occurrence of a clearance between the back lid 12 and the casing 5.

According to the second embodiment, the width $W_1$ from the casing-side end of the hood 12a of the back lid 12 to the leg 12b thereof is decreased to reduce the distance R from the casing-side end of the hood 12a to the shaft 10, obtaining less projection amount of the hood 12a of the back lid 12. Moreover, the inclined face 22 is formed at the back-lid-opening-side end of the upper side 5a of the upper half 51 of the casing 5 to have substantially the same angle of inclination as that of the inclined face 21 of the hood 12a of the back lid 12, so that the upper face 5a of the upper half 51 of the casing 5 is continuously connected to the hood 12a of the back lid 12 through the inclined faces 22, 21, preventing an occurrence of a level difference between the two.

Figure 17:
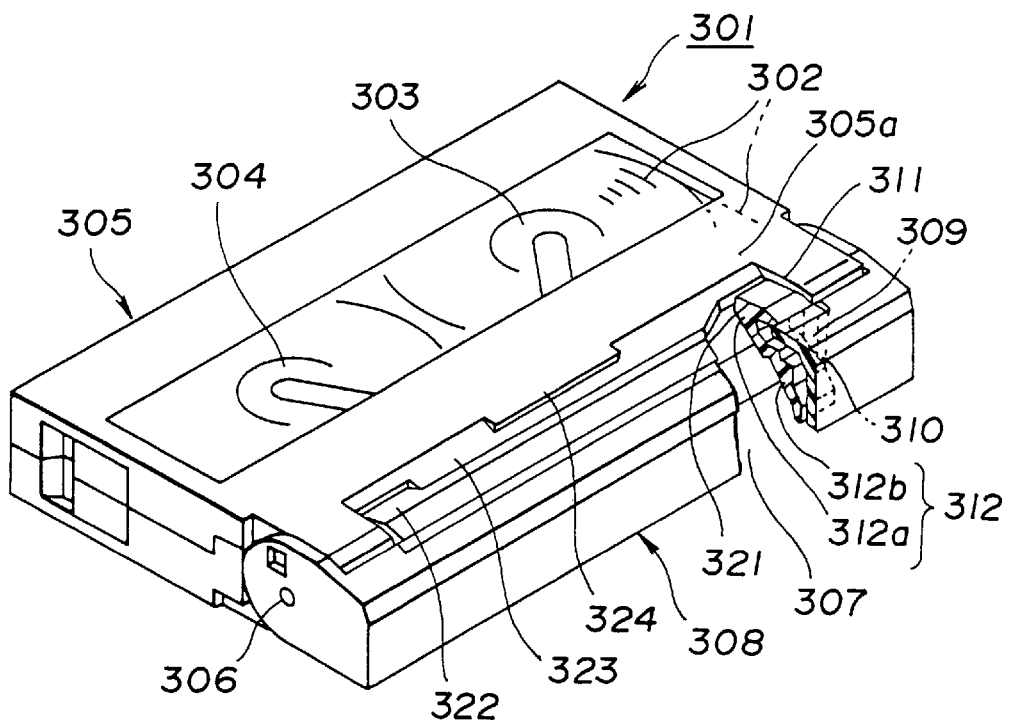
FIG. 17 is a view similar to FIG. 12, showing a third embodiment of a tape cartridge.
Figure 18:
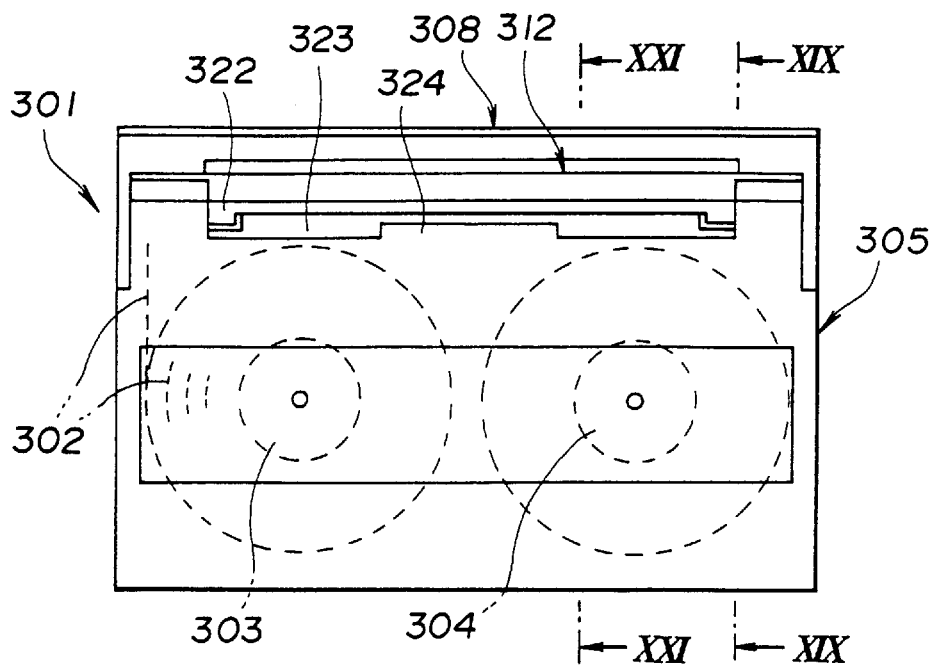
FIG. 18 is a view similar to FIG. 13, showing the tape cartridge.

FIGS. 17–22 show a third embodiment of the present invention. Referring to FIGS. 17–18, a tape cartridge 301 for use in an 8 mm VTR includes a casing or main body 305, a pair of tape reels 303, 304 rotatably accommodated therein and having a magnetic tape 302 wound, a front lid 308 rotatably mounted to the casing 305 through a shaft 306 for closing a tape loading space or pocket 307 thereof, a back lid 312 rotatably mounted to a bearing 309 of the front lid 308 through a shaft 310 and having a hood 312a for closing a back-lid opening 311 formed in an upper side 305a of the casing 305 and a leg 312b for protecting the back of the magnetic tape 302 positioned in the tape loading space 307, and a back-lid posture control device 313 (see FIG. 19) for controlling a posture of the back lid 312 which rotates with rotation of the front lid 308.

Figure 19:
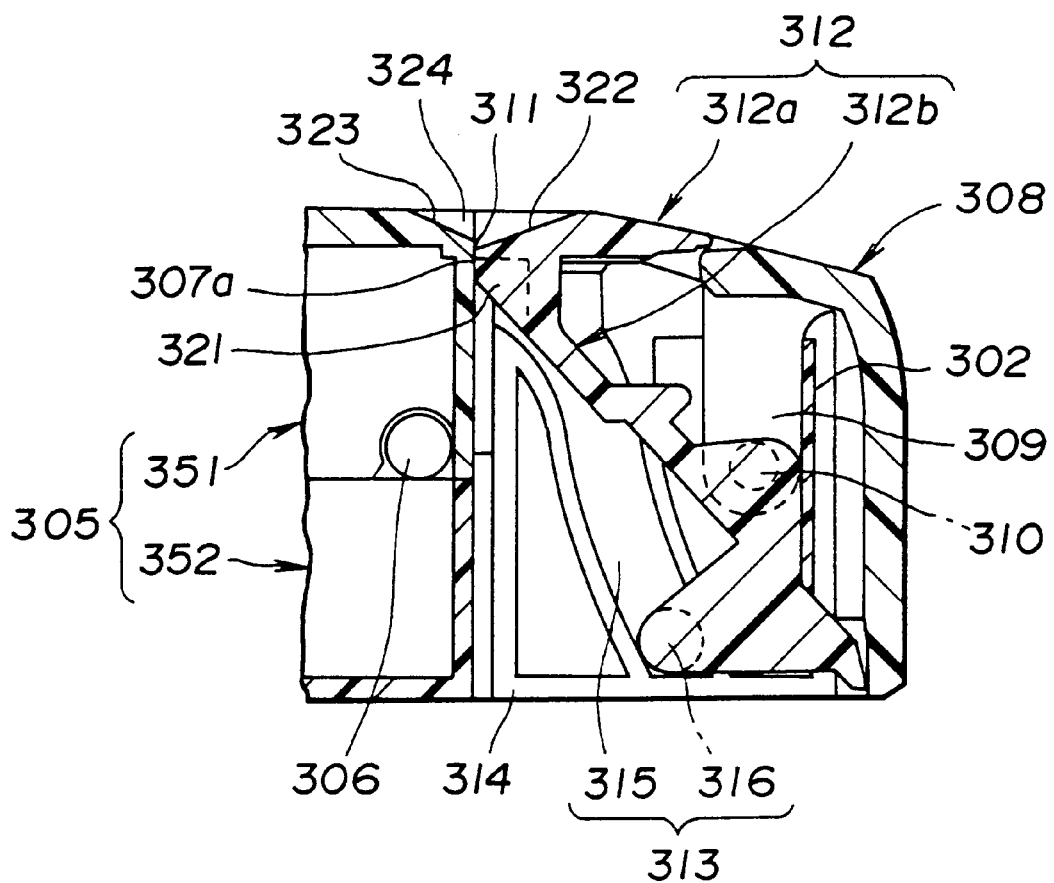
FIG. 19 is a view similar to FIG. 14, taken along the line XIX—XIX in FIG. 18.
Figure 20:
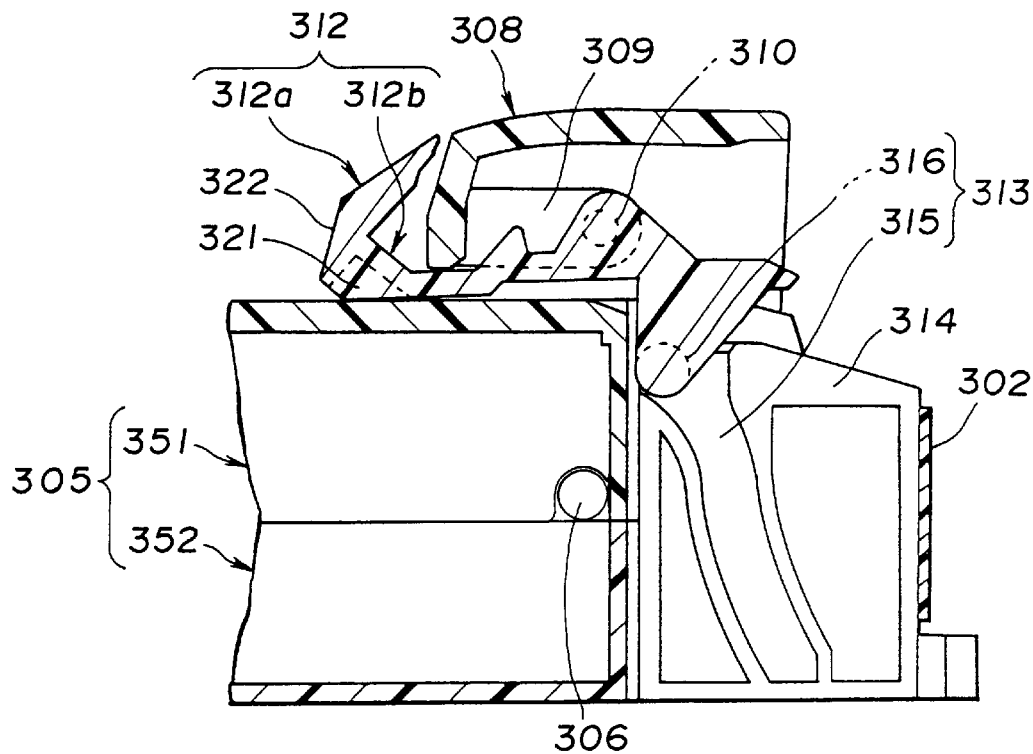
FIG. 20 is a view similar to FIG. 15, showing the tape cartridge with a lid open.
Figure 21:
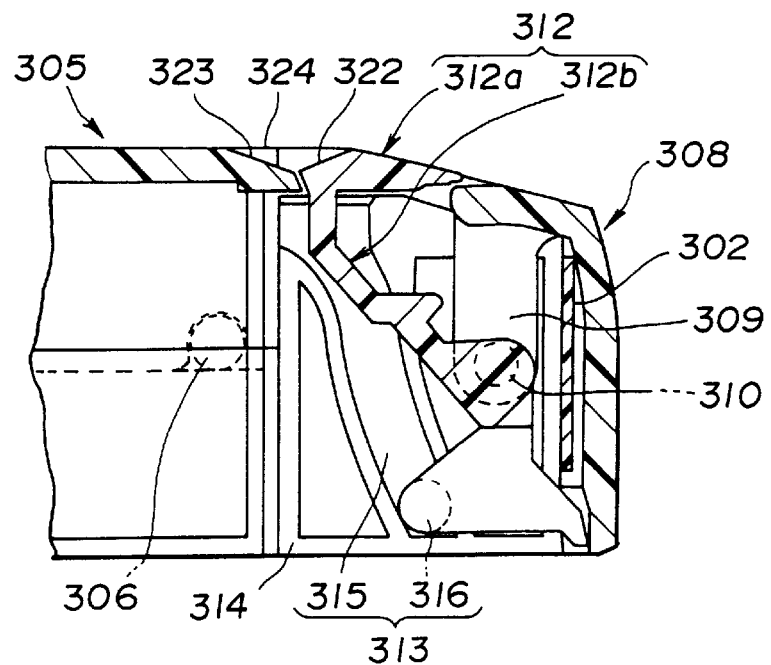
FIG. 21 is a view similar to FIG. 20, taken along the line XXI—XXI in FIG. 18.

Referring to FIG. 19, the back-lid posture control device 313 comprises a cam groove 315 formed in a back-lid support 314 and a cam boss 316 arranged with the leg 312b of the back lid 312 and slidably engaged with the cam groove 315. In order to obtain smooth sliding of the cam boss 316 in the cam groove 315, a predetermined clearance or play is arranged between the inner side face of the cam groove 315 and the outer side face of the cam boss 316.

When closing the tape loading space 307 of the casing 305, the hood 312a of the back lid 312 shuts the back-lid opening 311 formed at a tape-loading-space-side end of the upper side 305a of the casing 305, and the leg 312b of the back lid 312 protects the back of the magnetic tape 302 positioned in the tape loading space 307.

The back lid 312 is moved with the front lid 308 with its posture controlled by the back-lid posture control device 313 comprising the cam boss 316 and the cam groove 315, where the cam boss 316 arranged with the leg 312b of the back lid 312 is slidably engaged with the cam groove 315 of the back-lid support 314 of the casing 305.

The back lid 312 includes a reinforcement 321 which abuts on contact parts 307a arranged in the tape loading space 307 of the casing 305, i.e. part of an inside face thereof, for preventing deep engagement of the back lid 312 with the back-lid opening 311.

Figure 22:
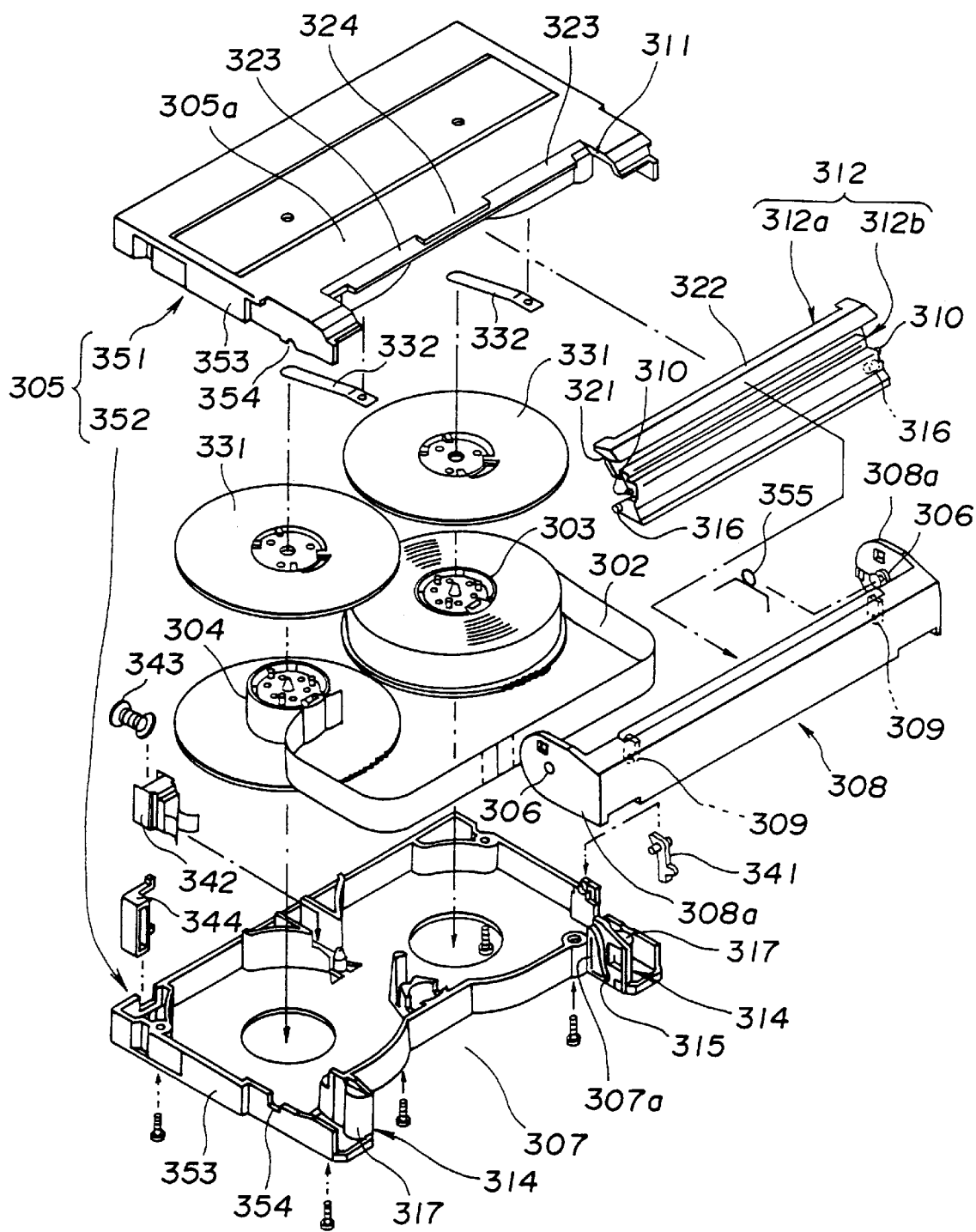
FIG. 22 is a view similar to FIG. 11, showing the tape cartridge.

Referring next to FIG. 22, the structure of the casing 305, the front lid 308, and the back lid 312 will be described in detail.

The casing 305 comprises an upper half 351 and a lower half 352. The upper half 351 has the back-lid opening 311, an inclined face 323, and a protrusion 324 in and on the upper face 305a. On the other hand, the lower half 352 has a pair of back-lid supports 314 on both sides of the tape loading space 307, the roots of which serve as the contact parts 307a for the reinforcements 321.

The back-lid supports 314 have opposite or inside faces formed with a pair of cam grooves 315, and outside faces formed with a pair of semi-cylindrical tape guides 317. The tape guide 317 serves to guide the magnetic tape 302 wound on the tape reels 303, 304 to run in the tape loading space 307 arranged in the lower half 352.

The reinforcement 321 includes a rib formed on the lower side of the casing-side end of the hood 312a of the back lid 312. Moreover, the reinforcement 321 extends from the lower side of the hood 312a to the side face of the leg 312b.

The hood 312a of the back lid 312 has on the casing-side upper side an inclined face 322 which gradually increases in level difference with respect to the upper side 305a of the casing 305 toward the casing 305 as shown in FIG. 19.

The casing 305 has on the hood-side upper side of the back lid 312 the inclined face 323 substantially symmetrical with respect to the inclined face 322 of the hood 312a of the back lid 312.

The casing 305 has in the center of the inclined face 323 the protrusion 324 for producing a level difference with respect to the casing-side end of the inclined face 322 of the hood 312a of the back lid 312. The protrusion 324 is obtained by partly increasing the thickness of the inclined face 323.

The front lid 308 has at both ends as viewed in the longitudinal direction a pair of arms 308a having opposite or inside faces to which shafts 306 are arranged. The front lid 308 is rotatably mounted to the casing 305 in the state held by the side walls 353 of the upper and lower halves 351, 352 through the shafts 306 of the opposite faces of the arms 308a, which are engaged with bearing recesses 354 formed in side walls 353 of the upper and lower halves 351, 352. Moreover, the front lid 308 undergoes torque of a torsion coil spring 355 to close the tape loading space 307.

The front lid 308 has inside the arms 308a a pair of bearings 309 as will be described later and for rotatably supporting the back lid 312.

As described above, the back lid 312 comprises the hood 312a and the leg 312b. The reinforcements 321 are formed at both ends of the casing-side lower side of the hood 312a to extend from the lower side thereof to the side face of the leg 312b. The inclined face 322 is formed at the casing-side upper side of the hood 312a. A pair of shafts 310 and a pair of cam bosses 316 are formed on both sides of the leg 312b as viewed in the cross direction thereof.

The back lid 312 is arranged between the casing 305 and the front lid 308 through the shafts 310 rotatably mounted to the bearings 309 of the front lid 308, and the cam bosses 316 engaged with the cam grooves 315 of the opposite faces of the back-lid supports 314 of the lower half 352. In this state, referring to FIG. 19, one end of the hood 312a closely abuts on one end of the back-lid opening 311 of the casing 305, and the reinforcement 321 of the lower side of the hood 312a closely abuts on the contact part 307a of the casing 305.

The tape reel 303, 304 includes an upper plate 331, and a plate spring 332 for lightly biasing the upper plate 331 and thus the tape reel 303, 304 to the lower half 352.

Rotatably mounted to the lower half 352 is a lid lock 341 for locking the front lid 308 in the closed way, whereas slidably mounted thereto is a reel lock 342 for unrotatably locking the tape reels 303, 304. The reel lock 342 is biased by a coil spring 343 in the direction of obtaining reel locking. Moreover, an anti-erase member 344 is slidably mounted to the lower half 352.

Next, the operation of the third embodiment will be described. When closing the back-lid opening 311 of the upper side of the upper half 351 of the casing 5 by the front lid 308, the back lid 312 is in a state as shown in FIG. 19 that the cam boss 316 of the leg 312b is positioned at the lower end of the cam groove 315, and the hood 312a closes the back-lid opening 311.

Figure 23:
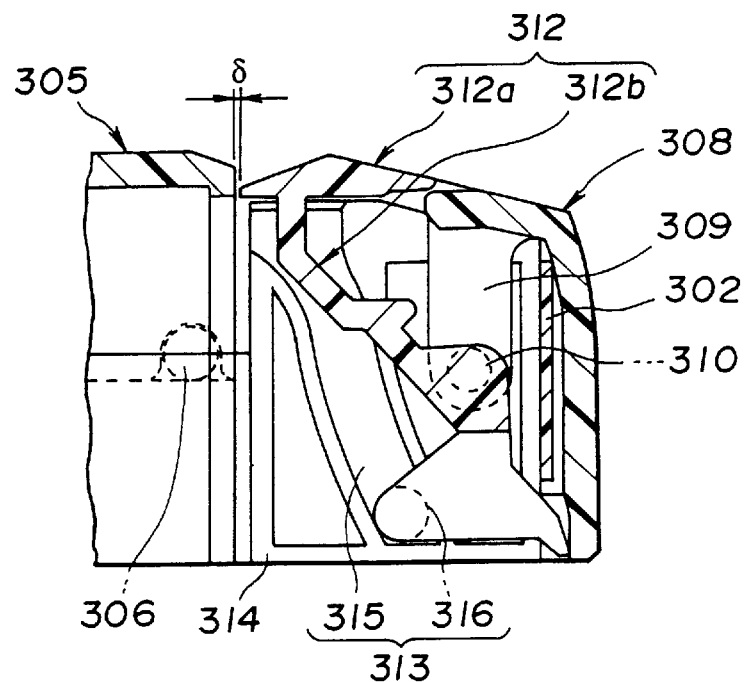
FIG. 23 is a view similar to FIG. 21, showing a problem of a tape cartridge with no reinforcement.
Figure 24:
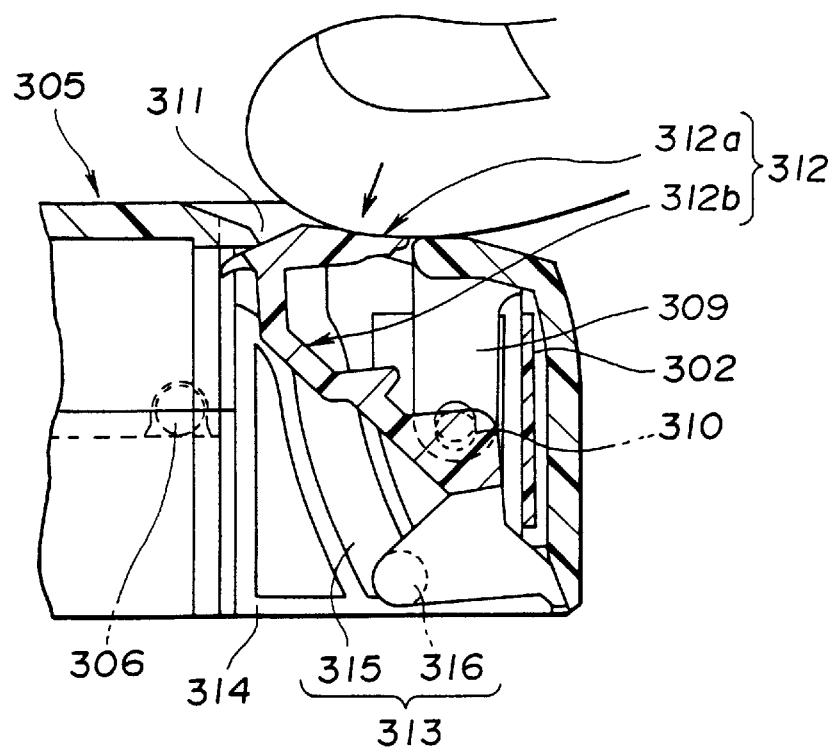
FIG. 24 is a view similar to FIG. 23, showing a problem of the tape cartridge with no reinforcement.

In this state, even if the hood 312a of the back lid 312 undergoes a force in the direction of engaging the back lid 312, deep engagement of the hood 312a of the back lid 312 with the back-lid opening 311 is surely prevented since both ends of the hood 312a abut on both ends of the back-lid opening 311 of the casing 305, and the reinforcement 321 of the lower side of the hood 312a abuts on the contact part 307a of the casing 305. In this connection, referring to FIGS. 23–24, if the hood 312a of the back lid 312 undergoes a force in the direction of engaging the back lid 312 when a clearance δ exists between one end of the hood 312a of the back lid 312 and one end of the back-lid opening 311 of the casing 305, and the lower side of the hood 312a has no reinforcement 321 as shown in FIG. 23, both ends of the hood 312a are bent as shown in FIG. 24, producing deep engagement of the back lid 312 with the back-lid opening 311.

Figure 25:
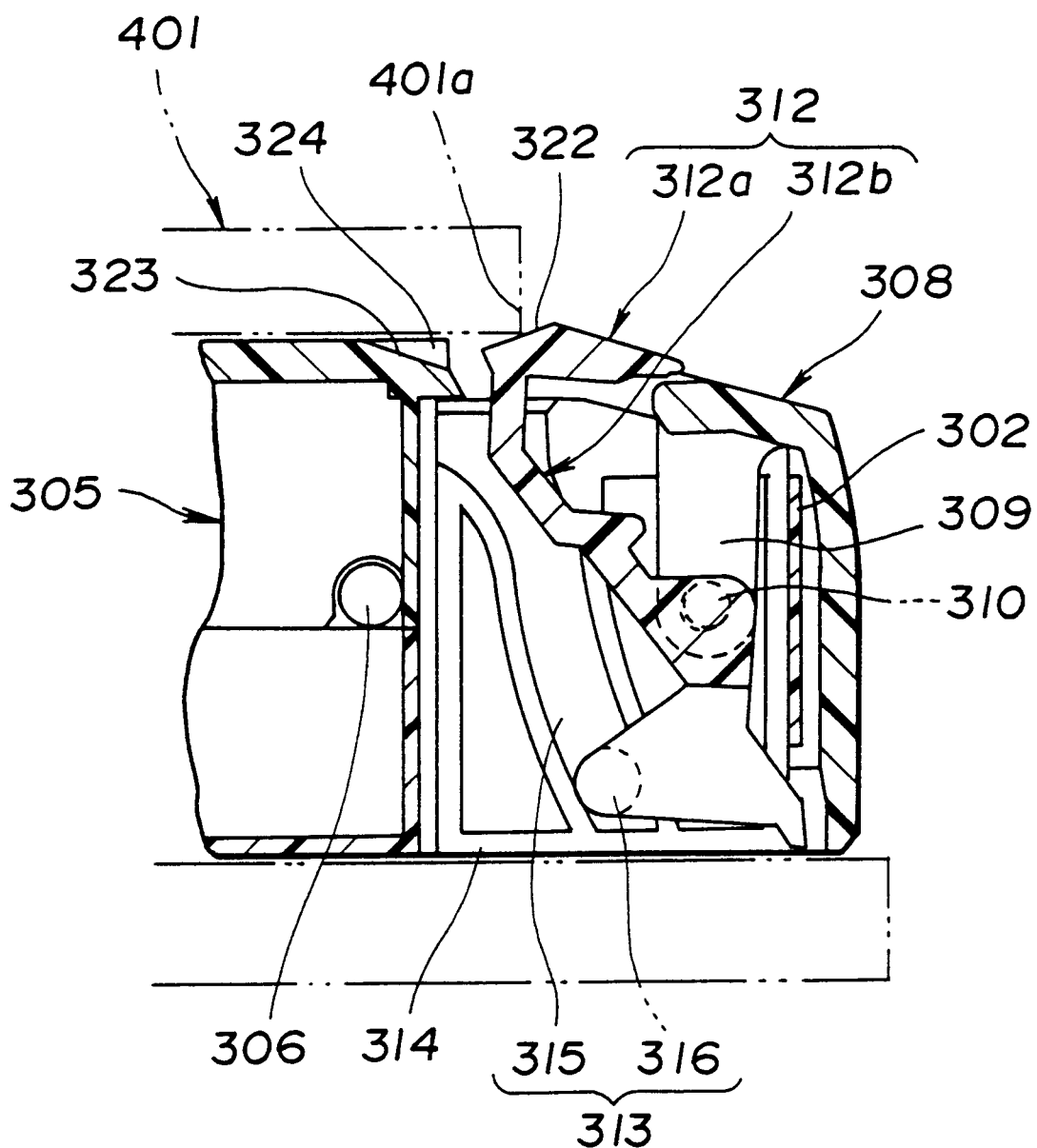
FIG. 25 is a view similar to FIG. 24, showing an effect of the third embodiment.

Moreover, due to the predetermined clearance or play arranged between the inner side face of the cam groove 315 and the outer side face of the cam boss 316, the projecting phenomena of the back lid 312 may be produced, which causes, referring to FIG. 25, interference of an end of the hood 312a of the back lid 312 with an end 401a of a cartridge compartment 401 of a VTR, resulting in impossible eject of the tape cartridge 301, etc. According to the third embodiment, the hood 312a of the back lid 312 has on the casing-side upper side the inclined face 322 which gradually increases in level difference with respect to the upper side 305a of the casing 305 toward the casing 305. Thus, as shown in FIG. 25, even with the projecting phenomena of the back lid 312, this not only restrains a projection of the end of the hood 312a of the back lid 312 from the upper side of the casing 305 to prevent occurrence of defective eject of the tape cartridge 301, but allows contact of the end 401a of the cartridge compartment 401 with the inclined face 322 to ensure smooth discharge of the tape cartridge 301.

Having described the present invention in connection with the preferred embodiments, it is noted that the present invention is not limited thereto, and various changes and modifications can be made without departing from the scope of the present invention.

By way of example, in the embodiments, the tape cartridge is of the double-lid type, alternatively, it may be of the multi-lid type including a front lid, a hood, a tape holding back lid or leg, etc.

Moreover, in the embodiments, the back-lid posture control device comprises the cam groove of the back-lid support of the casing, and the cam boss of the back lid. Alternatively, the back-lid posture control device may comprise a rail-like protrusion formed on the back-lid support, and a recess formed in the back lid and arranged on the protrusion.

What is claimed is:

1. A cartridge, comprising:
   a casing with a space arranged therein and an opening formed in an upper side thereof, said space accommodating a tape-like recording means wound on reels;
   a front lid rotatably mount ed to said casing, said front lid closing said space of said casing;
   a back lid rotatably mounted to said front lid, said back lid including a hood for closing said opening of said casing and a leg for protecting a rear surface of said recording means positioned in said space of said casing;
   a first inclined face arranged on an upper side of said hood of said back lid to be adjacent to said casing, said first inclined face being downwardly inclined from said upper side of said casing toward an end of said back lid opening when closing said back-lid opening of the upper side of said casing; and
   means for controlling the position of said back lid.

2. A cartridge as claimed in claim 1, wherein a level distance between a casing side end of said first inclined face of said hood of said back lid and the upper side of said casing is greater than a projection amount of said hood of said back lid.

3. A cartridge as claimed in claim 1, wherein a width from an end of said hood of said back lid adjacent to said casing to said leg of said back lid has a reduced value to decrease a distance between said end of said hood and an axis of rotation of said back lid.

4. A cartridge as claimed in claim 1, further comprising:
   a second inclined face arranged on said upper side of said casing, said second inclined face being substantially symmetrical with respect to said first inclined face.

5. A cartridge as claimed in claim 1, further comprising:
   a reinforcement formed with said back lid, said reinforcement abutting on a contact part arranged in said space of said casing to prevent deep engagement of said hood of said back lid with said opening of said casing.

6. A cartridge as claimed in claim 5, wherein said reinforcement includes a rib formed with a lower side of said hood of said back lid to be adjacent to said casing.

7. A cartridge as claimed in claim 6, wherein said reinforcement extends from said lower side of said hood of said back lid to a side face of said leg of said back lid.

8. A cartridge as claimed in claim 1, further comprising:
   a protrusion formed with said second inclined face, said protrusion producing a level difference between said casing and said first inclined face.

9. A cartridge as claimed as in claim 1, wherein a level distance between a casing side end of said first inclined face of said hood of said back lid and the upper side of said casing is greater than a projection amount of said hood of said back lid.

10. A cartridge as claimed in claim 1, wherein a width from an end of said hood of said back lid adjacent to said casing to said leg of said back lid has a reduced value to decrease a distance between said end of said hood and an axis of rotation of said back lid.

11. A cartridge as claimed in claim 1, further comprising:
a second inclined face arranged on said upper side of said casing, said second inclined face being substantially symmetrical with respect to said first inclined face.

12. A cartridge as claimed in claim 1, wherein said reinforcement includes a rib formed with a lower side of said hood of said back lid to be adjacent to said casing.

13. A cartridge as claimed in claim 12, wherein said reinforcement extends from said lower side of said hood of said back lid to a side face of said leg of said back lid.

14. A cartridge as claimed in claim 1, further comprising:
a protrusion formed with said second inclined face, said protrusion producing a level difference between said casing and said first inclined face.

15. A cartridge, comprising:
a casing with a space arranged therein and an opening formed in an upper side, said space accommodating a tape-like recording means wound on reels;
a front lid rotatably mounted to said casing, said front lid closing said space of said casing;
a back lid rotatably mounted to said front lid, said back lid including a hood for closing said opening of said casing and a leg for protecting a back of said recording means positioned in said space of said casing;
a reinforcement formed with said back lid, said reinforcement abutting on a contact part arranged in said space of said casing to prevent deep engagement of said hood of said back lid with said opening of said casing; and
a device arranged to control a posture of said back lid.

16. A cartridge as claimed in claim 15, wherein said reinforcement includes a rib formed with a lower side of said hood of said back lid to be adjacent to said casing.

17. A cartridge as claimed in claim 16, wherein said reinforcement extends from said lower side of said hood of said back lid to a side face of said leg of said back lid.

18. A cartridge, comprising:
a casing with a space arranged therein and an opening formed in an upper side thereof, said space accommodating a tape-like recording means wound on reels;
a front lid rotatably mounted to said casing, said front lid closing said space of said casing;
a back lid rotatably mounted to said front lid, said back lid including a hood for closing said opening of said casing and a leg for protecting a rear surface of said recording means positioned in said space of said casing;
a first inclined face arranged on an upper side of said hood of said back lid to be adjacent to said casing, said first inclined face being downwardly inclined from said upper side of said casing toward an end of said back lid opening when closing said back-lid opening of said casing;
means for controlling the position of said back lid; and
a reinforcement formed with said back lid, said reinforcement abutting on a contact part arranged in said space of said casing to prevent deep engagement of said hood of said back lid with said opening of said casing.

* * * * *